United States Patent [19]

Sherwood

[11] Patent Number: 4,747,508

[45] Date of Patent: May 31, 1988

[54] FUEL TANK VENTING

[75] Inventor: Carl H. Sherwood, Brockport, N.Y.

[73] Assignee: General Motors Corporation, Detroit, Mich.

[21] Appl. No.: 23,158

[22] Filed: Mar. 9, 1987

[51] Int. Cl.⁴ .............................................. B65B 31/06
[52] U.S. Cl. .................................... 220/86 R; 141/59; 141/326; 220/85 VS; 220/85 VR
[58] Field of Search ........... 220/86 R, 85 VS, 85 VR; 141/51, 59, 325, 326, 349

[56] References Cited

U.S. PATENT DOCUMENTS

| | | | |
|---|---|---|---|
| 3,380,619 | 4/1968 | Boddie | 220/86 R |
| 3,394,842 | 7/1968 | Randolph | 220/86 R |
| 4,044,913 | 8/1977 | Brunnert | 141/326 |
| 4,572,394 | 2/1986 | Tanahashi | 220/86 R |
| 4,625,777 | 12/1986 | Schmidt | 141/326 |
| 4,630,749 | 12/1986 | Armstrong | 220/86 R |
| 4,659,346 | 4/1987 | Uranishi | 220/86 R |

Primary Examiner—George E. Lowrance
Attorney, Agent, or Firm—Patrick M. Griffin

[57] ABSTRACT

In a vehicle fuel system having a fuel tank with a filler pipe having an upper end closable by a removable cap and opening to the atmosphere when the cap is removed to receive an inserted object and a fuel vapor storage canister, a venting means that allows the cap to be removed while preventing pressurized fuel vapors generated in the tank when the filler pipe is closed from reaching the atmosphere. When the cap is removed, a valve is opened, while a seal means independent of the cap remains closed. Thus, vapors are blocked from the atmosphere, but allowed to exit past the valve to the canister. In addition, the seal means engages a conventionally sized fuel nozzle, providing another seal so that fuel fill vapors are similarly controlled.

3 Claims, 2 Drawing Sheets

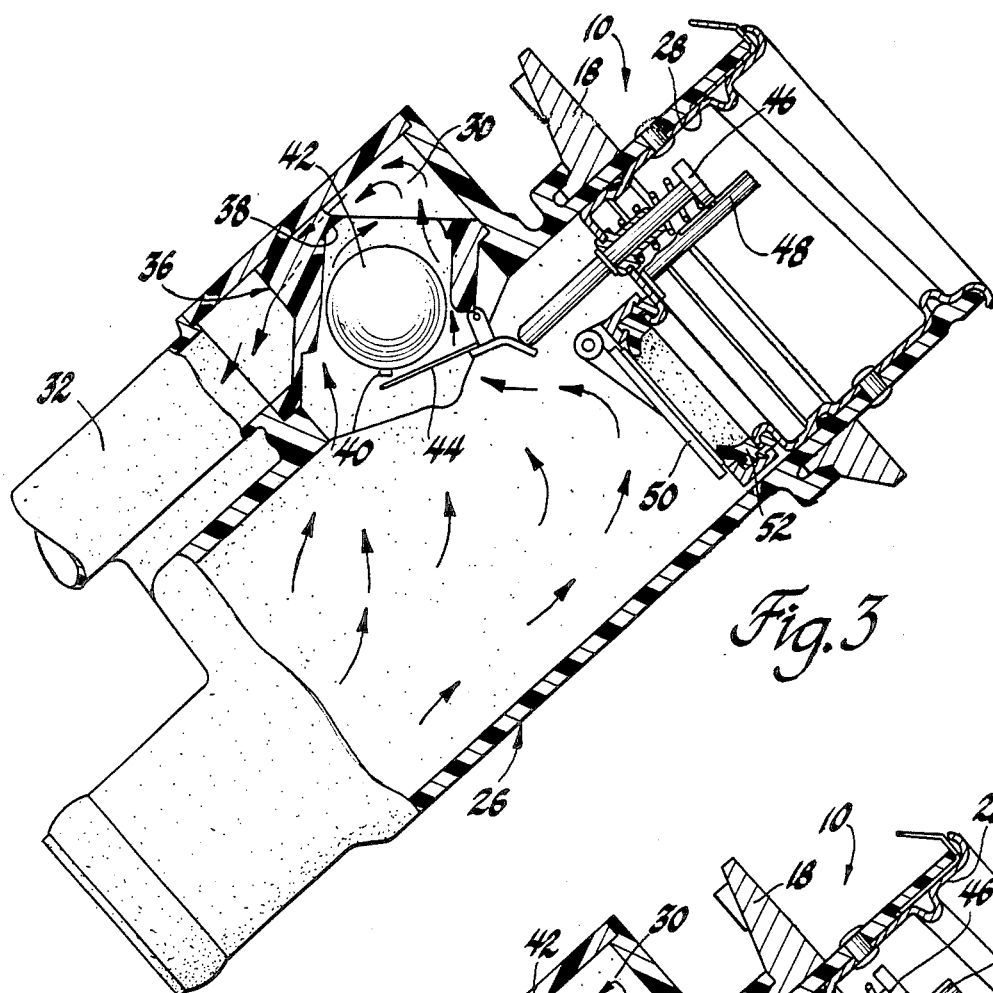
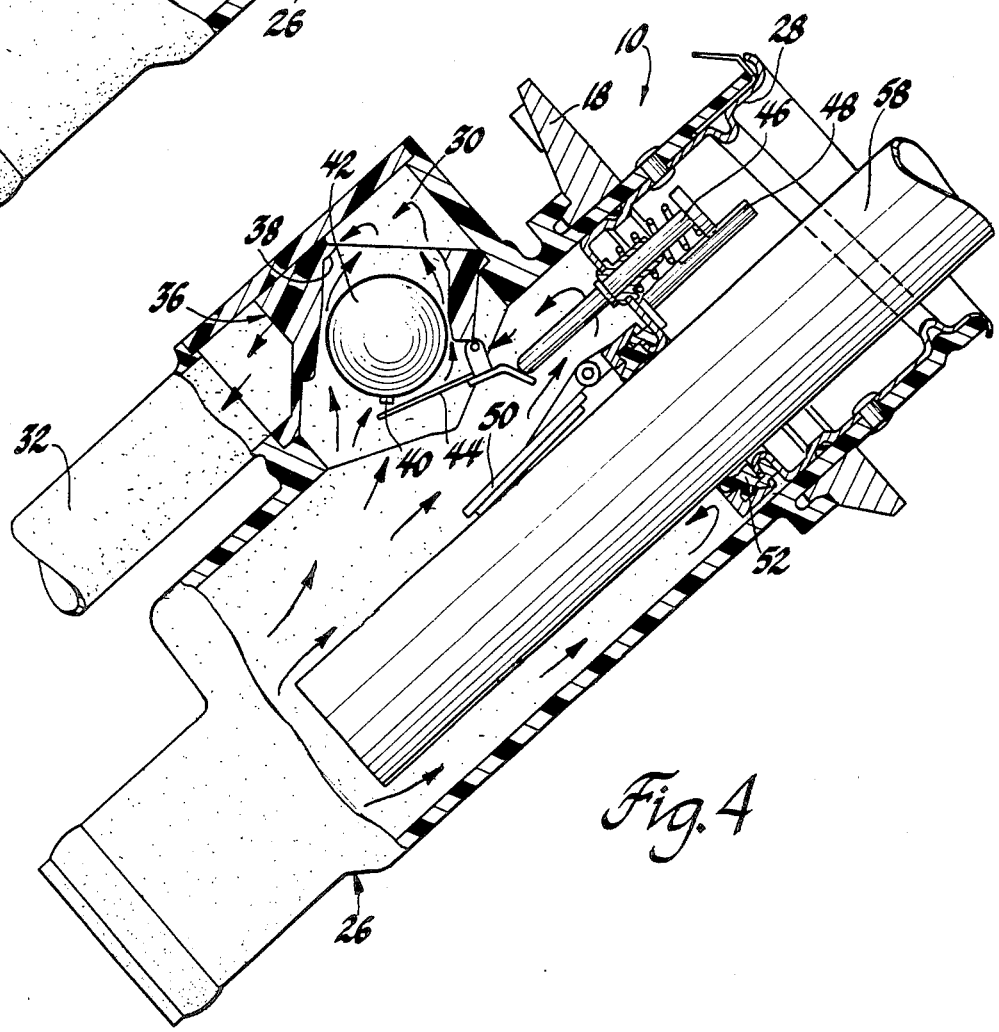

FUEL TANK VENTING

This application relates to fuel tank venting in general, and specifically to a fuel tank venting means that is designed to control what are commonly known as "puff losses."

BACKGROUND OF THE INVENTION

Motor vehicle fuel vapor emission standards have been in effect for some time, and are becoming increasingly stringent. Originally, evaporative emission control efforts were directed at preventing the loss to the atmosphere of fuel vapors emitted from the carburetor and the loss of fuel vapors generated in the fuel tank. The typical evaporative emission control system that arose from such efforts, which is commonly used in production today, includes a vapor storage canister charged with activated absorbent charcoal pellets. The carburetor and fuel tank are both connected to the canister through various arrangements of hoses and control valves. Current work is aimed as well at recovering the raw hydrocarbons lost to the atmosphere while the fuel tank is being filled. Several designs have been proposed and used to recover both the vapors generated from the fuel dispensing nozzle itself as well as the vapors displaced from the tank and up the filler pipe by the entrance of the fuel. Various arrangements of hoods and vent lines have been used to direct such fuel fill vapors away from the atmosphere and to the vapor storage canister. A lesser, though not inconsiderable vapor loss is the pressurized tank vapors that exit almost immediately to the atmosphere through the upper end of the fuel tank filler pipe when the gas cap is first removed. This loss has come to be called a "puff loss" due to the distinctive popping sound that occurs as the cap is removed, which is most noticeable on a hot day.

The vent system disclosed in the U.S. Pat. No. 4,572,394 to Tanahashi et al purports to deal with puff losses, but in a very impractical manner. As there disclosed, an additional canister would be provided surrounding the filler pipe itself. The removal of the gas cap would allow a bellows held within a large cone shaped upper end of the filler pipe to shift, purportedly quickly enough to simultaneously block off the upper end of the filler pipe and also direct puff loss vapors into the additional canister. The room taken by, and the added expense of, the extra canister, as well as the radical departure from conventional filler pipe design, make the system highly undesirable. U.S. Pat. No. 4,630,749 to Armstrong et al, assigned to the assignee of the present invention, controls fuel vapors with the storage canister of a conventional evaporative emission control system. The venting means there disclosed has a flapper door that engages an annular seal located below the cap, but upstream of a canister connected fitting that opens to the filler pipe. The fitting opening is normally closed by a spring loaded ball valve. Just after cap removal, the flapper door is still closed on the seal to prevent puff loss at that point. The flapper door does not open until the fuel nozzle is inserted to push it open, but, before the nozzle opens the flapper door, it passes through the annular seal, creating a new barrier to the puff loss. As the flapper door is pushed open, a projection on it in turn opens the ball valve to open a path for the pressurized fuel vapors, both the puff loss vapors and fill vapors that occur during the fuel fill operation. In this design, the control of puff losses depends on the engagement of the seal with a properly sized fuel nozzle. Absent that, an opening would be created to the atmosphere as soon as the flapper door was pushed open. While the flapper door would generally be pushed open only by such a properly sized nozzle, it is possible that it could be opened by a too small nozzle, or by some object other than a nozzle, as when the operator was adding something other than nozzle dispensed fuel to the fuel tank. Puff losses would not be controlled under those circumstances.

SUMMARY OF THE INVENTION

The invention provides a venting means that controls the above described puff losses, and which does so entirely as a function of cap removal, independent of whether a fuel dispensing nozzle is later inserted. However, in the preferred embodiment disclosed, the same structure also cooperates with the fuel nozzle when it is inserted to similarly control vapors generated during the fill operation. The invention works in conjunction with the already present vapor storage canister of a conventional evaporative emission control system.

In the preferred embodiment, a vehicle fuel system with a conventional fuel tank has a filler pipe with a side chamber. The chamber has a first opening that is connected by a hose line to the vapor storage canister and a second opening communicating with the inside of the filler pipe, below the upper end of the filler pipe. The second opening is defined by a partially spherical valve seat that separates the two chamber openings. A float ball is movable below the valve seat, and act as a valve, moving from an open position beneath the valve seat to a closed position against the valve seat, blocking communication between the two chamber openings. A lever pivoted to the inside of the filler neck is held up by a spring loaded plunger, which is in turn held down by the cap when it is in place. Closing the filler pipe with the cap actuates the float ball valve, holding it against the valve seat in its closed position so that vapors cannot then flow to the storage canister. When the cap is removed, the plunger springs up, and the lever falls down to release the float ball to the open position.

An annular seal is supported within the filler pipe, located above the chamber second opening, but below the cap. In the embodiment disclosed, the annular seal is also sized so as to allow the cylindrical fuel nozzle to pass therethrough with a wiping engagement. A spring loaded flapper door is pivoted inside the filler pipe, and is normally engaged with the underside of the annular seal, covering the central opening through the annular seal. The annular seal and flapper door thus act to block the filler pipe upper end from the atmosphere, independently of whether the cap is in place or removed. As the cap is removed, the ball valve falls to open position, and any pressurized vapors that had built up within the filler neck while the cap was on have ample time to pass through the chamber and to the storage canister. This occurs regardless of whether the flapper door is opened later at all, and regardless of whether the object that does pass through the flapper door is the correct size to engage the annular seal. In the preferred embodiment, since the cylindrical fuel nozzle does match the opening through the annular seal, it passes through the seal when inserted to create simultaneously with pushing the flapper door open. Another seal is thereby created to block the filler pipe. Thus, the same structure acts to control fuel vapors generated during fuel dispensing. In addition, in the case of a fuel overfill from the nozzle, the float ball can move up to close off the chamber so that liquid fuel will not run into the vapor canister.

It is, therefore, an object of the invention to control fuel tank puff losses with a venting means that is operated by cap removal, including a chamber opening to the filler pipe and to a vapor storage canister with a cap operated valve closing the chamber when the cap is on and opening it when the cap is removed, and also including a seal means above the chamber and below the cap that blocks off the filler pipe from atmosphere independent of the cap, but which will allow an inserted object to pass through, so that pressurized fuel vapors in the filler pipe are kept from the atmosphere and routed through the chamber to the storage canister when the cap is removed, before any object is passed through the seal.

It is an additional object of the invention to provide such a venting means in which the seal means that blocks off the filler pipe independently of the cap also forms a seal around an inserted fuel nozzle, so that fuel vapors produced during the filling operation may be similarly kept from the atmosphere and controlled.

DESCRIPTION OF THE PREFERRED EMBODIMENT

These and other objects and features of the invention will appear from the following written description and from the drawings, in which:

FIG. 3 is a view similar to FIG. 2, but showing the cap removed; and

FIG. 4 is a view similar to FIG. 3, but showing the fuel nozzle inserted.

Figure 1:
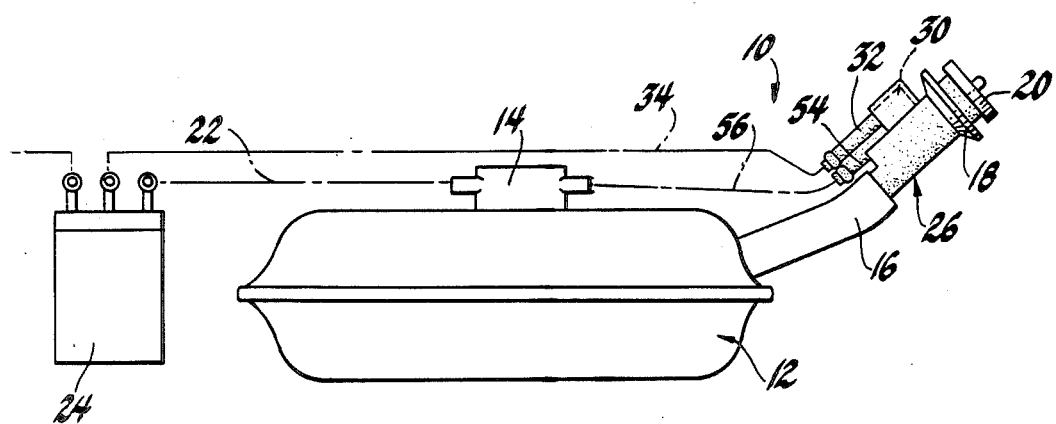
FIG. 1 is a schematic representation of a vehicle fuel system including the preferred embodiment of the invention.

Referring first to FIGS. 1 and 4, the preferred embodiment of the venting means of the invention, designated generally at 10, is used in conjunction with a conventional vehicle fuel system having a fuel tank, designated generally at 12. Fuel tank 12 has a vapor dome 14 at the top, and a conventionally sized filler pipe 16. Filler pipe 16 is supported at its upper end to the vehicle body by a support flange 18, and is closed by a removable cap designated generally at 20. While cap 20 is in place, pressurized fuel vapors will naturally form in tank 12, some of which will collect in dome 14. Vapors from dome 14 are continually vented by a hose line designated schematically at 22 to a conventional vapor storage canister 24, rather than just venting tank 12 to the atmosphere. A separate tank pressure control valve, not shown, would allow air to enter or leave tank 12 to compensate for the volume of fuel entering or leaving. There is a practical limit to how much vapor can be collected by canister 24 through hose line 22, as too much venting though 22 would over saturate storage canister 24, and, it is felt, actually encourage vapor formation in tank 12. Therefor, some fuel vapor pressure will inevitably form in tank 12, which is actually beneficial, to an extent, as it can discourage further vapor formation. Some of the pressurized fuel vapor so formed, however, will rise in filler pipe 16, and can exit to atmosphere when cap 20 is removed, barring a control measure. These vapors constitute the so called puff loss, and are most evident on a warm day. Also, when fuel is added, vapors are produced both from the dispensed fuel and from the air vapor mixture in the tank is displaced from the tank 12 as the fuel enters. These fill vapors would exit out the end of filler pipe 16 to the atmosphere without some control measure. The venting means of the invention 10 provides such vapor control, actuated solely by the removal of cap 20, and does so using the already present canister 24 with little alteration to filler pipe 16.

Figure 2:
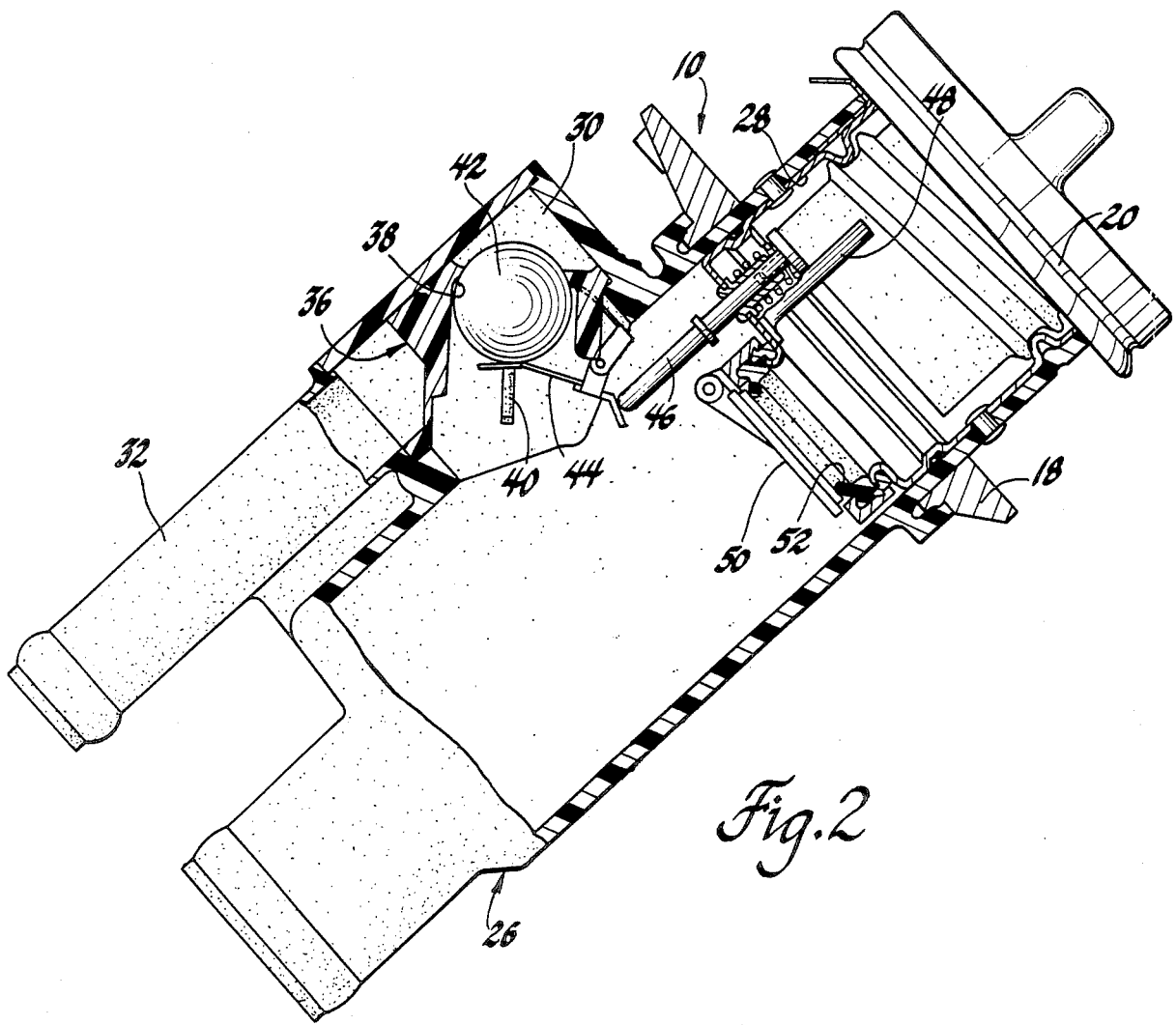
FIG. 2 is an enlarged sectional view of the top of the filler neck and the venting means for the invention, showing the cap in place.

Referring next to FIGS. 1 and 2, a substantially cylindrical plastic housing, designated generally at 26 is pressed into, and forms the upper end of, filler pipe 16. Housing 26 is molded essentially as a unit, and includes or supports several other structures. Riveted into the upper end of housing 26 is a stamped metal insert 28 into which the cap 20 is threaded in conventional fashion. On the side and approximate center of housing 26 is a chamber 30 and a first fitting 32 that provides a first chamber opening, and which is connected by a hose line 34 to the vapor storage canister 24. A hollow valve body located inside chamber 30, designated generally at 36, provides a second opening that communicates with the interior of housing 26. Valve body 36 includes a partially spherical valve seat 38 that separates the two openings so provided. Ribs depending from valve body 36, one of which is visible in FIG. 3 at 40, guide a float ball 42 beneath valve seat 38. A lever 44 is pivoted to the inside of housing 26 with one end beneath float ball 42. The other end of lever 44 is located beneath the lower end of a spring loaded plunger 46 mounted through insert 28. The upper end of plunger 46 is located beneath the bottom edge of cap 20, and is protected therefrom by a shield 48. Finally, a spring loaded flapper door 50 is pivoted to insert 28, and, as seen in FIG. 2, is normally resiliently engaged with the underside of annular seal 52. Flapper door 50 provides the conventional function of inhibiting the introduction of leaded fuel where unleaded fuel is required, and serves an additional function in the invention, described below. Finally, a second fitting 54 molded with housing 26 opens into housing 26 downstream of the valve body 36, and is connected to tank vapor dome 14 by a hose line 56, for a purpose described below. It will be seen that there are manufacturing and assembly advantages to the preferred embodiment 10 as described so far. Components such as the flapper door 50 and plunger 46 may be attached to the metal insert 28 as a subassembly, while components such as the valve body 36 and lever 44 may be attached to the housing 26 as another subassembly. Then, insert 28 may be riveted to housing 26 to create a further subassembly, which is then pressed into filler pipe 16 to form its upper end. The hose line 34 and 56 are then added to the fittings 32 and 54. All components are basically conventionally sized and connected to existing conventional structures, such as tank dome 14 and canister 24.

Referring next to FIGS. 2 through 4, the operation of the invention may be understood. Float ball 42 acts as a valve, moving from an open position beneath valve seat 38, see FIG. 3, to a closed position against the valve seat 38, see FIG. 2. In the closed position, float ball 42 blocks communication between the two openings to chamber 30. Ball 42 is moved between its open and closed positions solely by act of adding and removing cap 20, as follows. Lever 44, when it is pivoted up, holds ball 42 in its closed position. When pivoted down, lever 44 allows ball 42 to fall to the open position. Lever 44, in turn, is actuated by plunger 46. Plunger 46, when it is pushed down, pivots lever 44 up, while allowing lever 44 to pivot down as it springs up. Finally, plunger 46 is operated by the cap 20, being pushed down when the cap 20 is added, and being allowed to spring up when cap 20 is removed. No act other than adding or removing the cap 20 is needed to move ball 42. With cap 20 on, and ball 42 closed, fuel vapors cannot flow past valve seat 38 and on to the storage canister 24 through hose 34, nor can vapors flow from dome 14 to housing 26. Thus, hose line 56 may be larger than hose line 22, which is typically restricted for the reasons noted above. With the cap 20 removed and ball 42 open, pressurized fuel vapors can flow past valve seat 38 and out hose line 34 to canister 24. These vapors may emerge directly from filler pipe 16, or may come from dome 14 through hose line 56. However, vapors will be blocked from the atmosphere by the seal provided by flapper door 50 and seal 52, which provide an atmosphere seal that acts independently of the cap 20. Thus, the so called puff loss vapors have time to be stored, or at least substantially stored, in canister 24 before anything breaks the close of seal 52. Most often, the object that opens flapper door 50 will be a conventionally sized fuel dispensing nozzle such as that shown at 58 in FIG. 4. In the embodiment disclosed, seal 52 is sized to wipingly engage the outside surface of nozzle 58, forming another seal to continue to block fuel fill vapors from the atmosphere, which are stored in canister 24 as were the initial puff loss vapors. That is an added advantage cooperatively provided by the invention's structure. However, it will be easily understood that whatever object breaks the close, the act alone of removing the cap 20 will have relieved the pressure and prevented puff loss. Using a float ball 42 as a valve also gives the advantage of blocking liquid fuel from hose line 34 in the event of an overfill, as ball 42 will float to its closed position when liquid fuel rises too high and enters housing 26. Though not shown, a conventional relief valve for such liquid overfill could be added to insert 28, as well.

Variations of the preferred embodiment may be made within the spirit of the invention. For example, a cap operated valve actuation means other than plunger 46 could be provided. Likewise, a seal means other than flapper door 50 and annular seal 52 could be provided, such as a split diaphragm that nozzle 56 could be pushed through. A valve other than float ball 42 would serve, so long as it closed when the cap was added, and opened when it was removed. As long as the relation of the valve to the seal means is maintained, and as long as the valve is cap operated, the puff losses are prevented. Therefore, it will be understood that the invention is not intended to be limited to the embodiment disclosed.

The embodiments of the invention in which an exclusive property or privilege is claimed are defined as follows:

1. In a vehicle fuel system having a fuel tank with a filler pipe having an upper end closable by a removable cap and opening to the atmosphere when said cap is removed to receive an inserted object, said system also having a fuel vapor storage canister to which said fuel tank is connected, a venting means that allows said cap to be removed while preventing pressurized fuel vapors generated in said tank when said filler pipe is closed from reaching the atmosphere, comprising,
   a chamber having a first opening connected to said canister and a second opening communicating with said filler pipe below said filler pipe upper end,
   a valve seat located in said chamber between said two chamber openings,
   a valve movable from an open position beneath said valve seat to a closed position against said valve seat blocking communication between said two chamber openings,
   valve actuation means operable by said cap to hold said ball valve in its closed position when said filler pipe is closed by said cap, and to move said ball valve to its open position as said cap is removed, and,
   seal means located above said chamber second opening and below said cap, said seal means normally acting to block said filler pipe under end from the atmosphere independently of said cap while allowing said inserted object to pass through, whereby, as said cap is removed, said valve moves to its open position while said seal means independently blocks said filler pipe, so that said pressurized fuel vapors may exit through said chamber openings to be substantially stored in said canister before the inserted object passes through said seal means.

2. In a vehicle fuel system having a fuel tank with a filler pipe having an upper end closable by a removable cap, said upper end opening to the atmosphere when said cap is removed to receive an inserted fuel dispensing nozzle, said system also having a fuel vapor storage canister to which said fuel tank is connected, a venting means that prevents pressurized fuel vapors generated in said tank when said filler pipe is closed from reaching the atmosphere as said cap is removed and which also prevents fuel vapors generated during fuel dispensing from reaching the atmosphere, said venting means comprising,
   a chamber having a first opening connected to said canister and a second opening communicating with said filler pipe below said filler pipe upper end,
   a valve seat located in said chamber between said two chamber openings,
   a valve movable from an open position beneath said valve seat to a closed position against said valve seat blocking communication between said two chamber openings,
   valve actuation means operable by said cap to hold said ball valve in its closed position when said filler pipe is closed by said cap, and to move said ball valve to its open position as said cap is removed, and,
   seal means located above said chamber second opening and below said cap, said seal means normally acting to block said filler pipe upper end from the atmosphere independently of said cap, said seal means being adapted to allow said fuel nozzle to pass therethrough when it is inserted while making wiping sealing engagement with said fuel nozzle, whereby, as said cap is removed, said valve moves to its open position while said seal means independently blocks said filler pipe from the atmosphere, so that said pressurized fuel vapors may exit through said chamber openings to be substantially stored in said canister before fuel nozzle passes through said seal means, with the sealing engagement of said seal means and said fuel nozzle continuing to block said filler pipe so that fuel vapors generated during fuel dispensing will be prevented from reaching the atmosphere and may also exit through said chamber openings to be stored in said canister.

3. In a vehicle fuel system having a fuel tank with a filler pipe having an upper end closable by a removable cap, said upper end opening to the atmosphere when said cap is removed to receive an inserted cylindrical fuel dispensing nozzle, said system also having a fuel vapor storage canister to which said fuel tank is connected, a venting means that prevents pressurized fuel vapors generated in said tank when said filler pipe is closed from reaching the atmosphere as said cap is removed and which also prevents fuel vapors generated during fuel dispensing from reaching the atmosphere, said venting means comprising, a chamber having a first opening connected to said canister and a second opening communicating with said filler pipe below said filler pipe upper end, a spherical valve seat located in said chamber between said two chamber openings, a float ball movable from an open position beneath said valve seat to a closed position against said valve seat blocking communication between said two chamber openings, actuation means operable by said cap to hold said float ball in its closed position when said filler pipe is closed by said cap, and to allow said ball to fall to its open position as said cap is removed, an annular seal located above said chamber second opening and below said cap and having a diameter matching said fuel nozzle, and, a spring loaded flapper door normally engaged with the underside of said annular seal to block said filler pipe upper end from the atmosphere independently of said cap, said flapper door opening to allow said fuel nozzle to pass therethrough when it is inserted through said annular seal to make wiping sealing engagement with said fuel nozzle, whereby, as said cap is removed, said float valve falls to its open position while said flapper door and annular seal independently block said filler pipe from the atmosphere, so that said pressurized fuel vapors may exit through said chamber openings to be substantially stored in said canister before said fuel nozzle passes through said annular seal, with the sealing engagement of said annular seal and said fuel nozzle continuing to block said filler pipe so that fuel vapors generated during fuel dispensing will be prevented from reaching the atmosphere and may also exit through said chamber openings to be stored in said canister, said float ball also floating to its closed position to block communication between said chamber openings should fuel rise to that height within the filler neck.

* * * * *